United States Patent [19]

Hughes

[11] Patent Number: 5,027,390

[45] Date of Patent: Jun. 25, 1991

[54] COIN VALIDATION METHOD AND APPARATUS FOR A COIN TELEPHONE OR SIMILAR SYSTEM HAVING AN ESCROW MECHANISM

[75] Inventor: Larry M. Hughes, Largo, Fla.

[73] Assignee: Protel, Inc., Lakeland, Fla.

[21] Appl. No.: 362,018

[22] Filed: Jun. 6, 1989

[51] Int. Cl.⁵ .......................................... H04M 17/02
[52] U.S. Cl. ..................................................... 379/150
[58] Field of Search ........................ 379/150, 145, 152

[56] References Cited

U.S. PATENT DOCUMENTS 4,192,972  3/1980  Bertoglio et al. .................... 379/150

Primary Examiner—Stafford D. Schreyer
Attorney, Agent, or Firm—Duckworth, Allen, Dyer & Doppelt

[57] ABSTRACT

A coin collection and analyzation apparatus has a coin track extending between a coin opening and an escrow relay which escrows coins and then diverts them either to a collection box or to a customer return. The coins are analyzed while passing along the coin track to provide an output for operating the escrow relay for determining whether the coin is acceptable or is to be rejected.

5 Claims, 1 Drawing Sheet

COIN VALIDATION METHOD AND APPARATUS FOR A COIN TELEPHONE OR SIMILAR SYSTEM HAVING AN ESCROW MECHANISM

BACKGROUND OF THE INVENTION

1. Field of the Invention

The present invention relates generally to coin validation methods and apparatus, and in particular relates to coin validation techniques useful for a coin telephone or a similar system employing an escrow relay.

2. Description of the Prior Art

There are a variety of coin validation and authentication techniques described in the prior art.

A conventional coin telephone with coin validation means is shown schematically in FIG. 1 and referred to generally by the reference numeral 10. The coin telephone includes a housing 12, with a coin slot 14 at the upper front extremity of the housing 12, through which a coin 16 may be inserted by the customer. The coin telephone 10 includes a coin return housing 18, usually accessible via a swinging gate 20, and a coin collection box 22. (The customer return 18 and the collection box 22 are usually positioned side by side at the front of the telephone.)

The conventional telephone, as shown in FIG. 1, also includes a removable coin validator mechanism 24 and an escrow relay 26. The coin validator mechanism 24 includes two output openings 28 and 30, the first opening 28 positioned to permit a rejected coin to drop into the customer return 18, and the second opening 30 dimensioned to pass an accepted coin out of the validator 24 and into the escrow relay 26.

The coin validator 24 also typically includes a detection section 36 and coin tracks 32, 33 extending from the coin slot 14 to either of the exit openings 28 or 30. As is shown schematically in FIG. 1A, when the coin 16 passes through the coin detector 36, (note dashed line 34) if no action is taken to accept the coin, then the coin will simply pass through the exit opening 28 and into the customer return 18. On the other hand, if the coin detector 36 determines along path 34 that the coin 16 is acceptable, then a solenoid mechanism (not shown) operates an actuator gate 38, changing the path of the coin to that shown by dashed-dotted line 40, thus passing the coins through the second opening 30 and into the escrow relay 26.

If the coin 16 is in fact accepted into the escrow relay 26, the coin telephone may then either be operated by the customer, or alternatively the customer can operate a coin return mechanism (not shown) to eject the coin out of the escrow relay and into coin track 43 the customer return 18, as shown by dashed line path 42. On the other hand, if the coin telephone 10 is in fact utilized by the customer to make a call, then the escrow relay 26 deposits the coin 16 into the coin collection box 22, as shown by dotted line 44.

There are two difficulties with the above-described coin handling system in prior art coin telephones. First, such coin detectors frequently encounter difficulties with the electro mechanical actuator gate 38, which may become jammed or which may fail to operate, and therefore deter the efficient operation of the entire coin telephone. Second, a new class of public and coin telephones utilizes only the loop current along the tip and ring conductors from the telephone central office for powering all of the telephone functions. See, for example, U.S. Pat. Nos. 4,759,054 and 4,759,050. These so called "line-powered" coin telephones generate sufficient power to operate the escrow relay but may, under certain circumstances, be strained by the power requirements of the solenoid utilized to operate the acceptor gate 38 in prior art coin detector mechanisms.

SUMMARY OF THE INVENTION

The present invention is directed to a method and apparatus for validating and handling coins, particularly in a coin telephone. In accordance with the method of the present invention, every coin is passed along a coin track and analyzed for authenticity, with an output for each coin being provided indicative of whether each coin is valid or invalid. Thereafter, every coin is diverted into an associated escrow mechanism, and the escrow mechanism is operated responsive to the output to dispense the coin depending upon its valid or invalid status.

In a specific form, the apparatus of the present invention is designed as a retrofit coin validator for installation in a coin telephone of the type having a coin deposit opening and an escrow relay for diverting coins to either a coin collection box or to a customer return. In accordance with the present invention, the retrofit coin detector comprises a coin track having a receiving end dimensioned to mate with the coin deposit opening and which feeds all coins into the escrow relay. Means are provided along the coin track for electronically analyzing each coin and providing either a valid coin signal or an invalid coin signal as an output to the escrow relay.

DETAILED DESCRIPTION

Figures 1, 2:
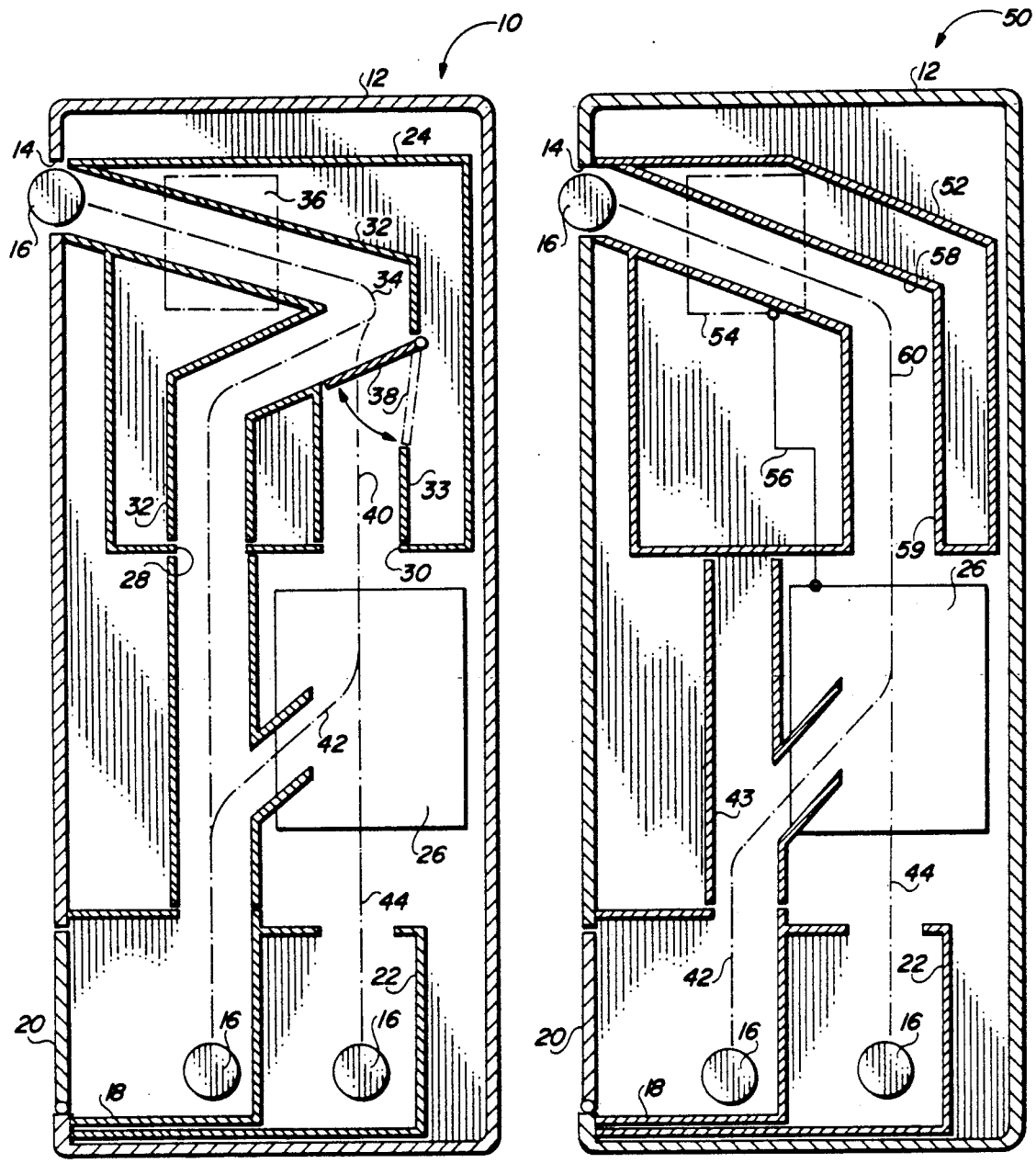
FIG. 1, as described above, is a schematic side view of a conventional coin telephone, with a portion shown in cross-section for illustration purposes.
FIG. 2 is a schematic side view like FIG. 1A of a coin telephone containing a retrofit coin validator in accordance with the present invention.

The present invention will now be described in detail with reference to FIG. 2, where like reference numerals are used to identify like elements with respect to the coin telephone system shown schematically in FIG. 1. The coin telephone system of FIG. 2, in its modified form, is referred to generally by the reference numeral 50, and includes a housing 12, coin opening 14 for receiving coin 16, a customer coin return 18 with access gate 20, a coin collection box 22, an escrow relay 26 and coin track 43.

The present invention specifically contemplates the use of a retrofit coin validator 52 designed for installation into the coin telephone within the confines of the dimensions of the prior art coin validators, such as that validator 24 shown schematically in FIG. 1. The retrofit coin validator 24 includes a coin detector section 54 having an output 56 coupled to the escrow relay 26 for providing an output indicating whether or not a valid coin has been received. The retrofit validator 52 also includes a coin track 58 which passes through the detector 54, and has a single exit opening 59 communicating only with the escrow relay 26.

In operation, every coin 16 passing along the coin track 58 is analyzed for authenticity in the detector 54, which then provides an output to the escrow relay 26, indicating whether the coin is to be either retained in escrow, or alternatively passed immediately out of escrow into the customer coin return 18. It will be understood that if the output 56 indicates that the coin is valid, the escrow relay 26 will then hold the coin in escrow, in accordance conventional coin telephone protocol. The coin may then with either be dispensed to the customer coin return 18 via coin track 43 and as shown by dashed line 42 (as for example, if the customer is unable to complete the call) or alternatively may be dispensed from the escrow relay 26 into the coin collection box 22, as indicated by dotted line 44.

It will thus be understood that the present invention provides a means by which every coin is passed along the coin track 58 and analyzed for authenticity, with the output of the detector 54 indicating whether the coin is valid or invalid. Thereafter, every coin is diverted directly into the escrow relay 26, and the escrow relay is then operated responsive to the output 56 from the coin detector 54 to either dispense the coin depending upon its valid or invalid status, or alternatively as controlled by conventional coin telephone protocol.

With respect to prior art coin validation techniques, it will be appreciated by those skilled in the art that the present invention avoids the difficulties associated with acceptor gates in prior art coin telephones, and also reduces the power demands for coin telephone operation, thereby enhancing the ability for the entire telephone to be operated from line power.

What is claimed is:

1. A method for separating valid and invalid coins, comprising the steps of:
   passing every coin along a coin track;
   analyzing every coin for authenticity and providing an output for each coin indicative of whether each coin is valid or invalid;
   thereafter diverting every coin into a single escrow mechanism capable of holding the coin in escrow; and the
   operating the escrow mechanism responsive to the output to dispense the coin out of the escrow mechanism in one of two directions depending upon it valid or invalid status.

2. The method recited in claim 1 wherein the escrow mechanism comprises an escrow relay in a coin telephone, and wherein the escrow relay dispenses every coin passing along the coin track to either a collection box or to a customer return.

3. A retrofit coin detector for installation in a coin telephone of the type having a coin deposit opening and an escrow relay for escrowing coins and then diverting coins to either a collection box or to a customer return, the retrofit coin detector comprising:
   a coin track having a receiving end dimensioned to mate with the coin deposit opening and an exit dimensioned to feed all coins into the escrow relay;
   means along the coin track for analyzing each coin and providing either a valid coin signal or an invalid coin signal as an output to the escrow relay and wherein
   the retrofit coin detector is free of any acceptor gate or other mechanism for impeding movement of a coin between the coin deposit opening and the escrow relay.

4. A coin telephone comprising:
   a telephone housing;
   a coin opening for permitting a customer to extend coins into the housing;
   a coin collection box within the housing;
   a coin escrow relay within the housing for dispensing coins into either the collection box or the customer return depending upon an input signal; and
   a coin detector in the housing, the coin detector dimensioned for receiving all coins passing through the coin opening and exit opening for dispensing all coins into the escrow relay, the coin detector further including means for generating the input signal to the escrow relay.

5. A method for accepting or rejecting coins in a coin-operated apparatus, comprising the steps of:
   providing a single escrow relay;
   providing a coin box and a coin return chute, each of which communicate only with the escrow relay;
   providing a con opening and a single coin track between the coin opening and the escrow relay;
   passing each coin from the coin opening along the coin track and into the escrow relay, and then escrowing each coin in the escrow relay until receipt of one of a plurality of signals, each of which signals indicates that the coin should be dispensed either into the coin box or alternatively into the return chute; and
   analyzing each coin for acceptability during passage of the coin along the track and providing one of the signals to the escrow relay responsive to the acceptability analysis.

* * * * *